US012627340B2

(12) United States Patent (10) Patent No.: US 12,627,340 B2
Gao (45) Date of Patent: May 12, 2026

(54) SRS SENDING METHOD AND APPARATUS FOR ANTENNA SWITCHING CONFIGURATION, AND STORAGE MEDIUM

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 18 days.

(21) Appl. No.: 18/692,391

(22) PCT Filed: Sep. 23, 2021

(86) PCT No.: PCT/CN2021/120011
§ 371 (c)(1),
(2) Date: Mar. 15, 2024

(87) PCT Pub. No.: WO2023/044684
PCT Pub. Date: Mar. 30, 2023

(65) Prior Publication Data
US 2024/0388340 A1     Nov. 21, 2024

(51) Int. Cl.
*H04B 7/06* (2006.01)
*H04B 7/08* (2006.01)
(Continued)

(52) U.S. Cl.
CPC ......... *H04B 7/0602* (2013.01); *H04B 7/0805* (2013.01); *H04L 5/0048* (2013.01); *H04W 28/18* (2013.01)

(58) Field of Classification Search
CPC .. H04B 7/0404; H04B 7/0602; H04B 7/0604; H04B 7/0691; H04B 7/0805;
(Continued)

(56) References Cited

U.S. PATENT DOCUMENTS

2020/0204407 A1*   6/2020  Liu ..................... H04L 27/2607
2023/0171067 A1*   6/2023  Wang ................... H04L 5/0051
                                                            370/329
(Continued)

FOREIGN PATENT DOCUMENTS

CN         112106310 A    12/2020
CN         113196698 A     7/2021
(Continued)

OTHER PUBLICATIONS

Xiaomi, "Discussion on SRS enhancements," 3GPP TSG-RAN WG1 Meeting #106-e, R1-2107898, e-Meeting, Aug. 16-27, 2021, 9 pages.
(Continued)

*Primary Examiner* — David B Lugo
(74) *Attorney, Agent, or Firm* — Finnegan, Henderson, Farabow, Garrett & Dunner, L.L.P.

(57) ABSTRACT

A method for sending sounding reference signal (SRS) used for antenna switching configuration is performed by a terminal. The method includes: determining an SRS type configured by the terminal for antenna switching configuration, wherein the SRS type includes at least two different SRS types; determining that an antenna switching configuration corresponding to an SRS resource of a first SRS type is changed to a target antenna switching configuration, and synchronously updating an antenna switching configuration corresponding to an SRS resource of a second SRS type as the target antenna switching configuration; selecting an SRS resource corresponding to the target antenna switching configuration as a target SRS resource; and sending the SRS resource of the first SRS type and the SRS resource of the second SRS type based on an antenna or an antenna port corresponding to the target SRS resource.

18 Claims, 8 Drawing Sheets

(51) Int. Cl.
   *H04L 5/00* (2006.01)
   *H04W 28/18* (2009.01)

(58) Field of Classification Search
   CPC ... H04L 5/0023; H04L 5/0051; H04L 5/0048;
       H04L 5/0094; H04W 28/18; H04W 72/04
   See application file for complete search history.

(56) References Cited

U.S. PATENT DOCUMENTS

| | | | |
|---|---|---|---|
| 2023/0403118 A1* | 12/2023 | Xiao ..................... | H04L 5/0051 |
| 2024/0187058 A1* | 6/2024 | Haghighat .......... | H04L 25/0226 |

FOREIGN PATENT DOCUMENTS

| | | |
|---|---|---|
| CN | 115023917 A | 9/2022 |
| CN | 115088223 A | 9/2022 |
| IN | 202047050035 A | 11/2020 |
| WO | WO 2021/159452 A1 | 8/2021 |
| WO | WO 2021/163938 A1 | 8/2021 |

OTHER PUBLICATIONS

Moderator (ZTE), "FL summary on SRS enhancements," 3GPP TSG RAN WG1 Meeting #102-e, R1-2007076, e-Meeting, Aug. 17-28, 2020, 38 pages.
International Search Report of International Application No. PCT/CN2021/120011, dated Apr. 26, 2022, 5 pages.
The First Office Action issued by the State Intellectual Property Office of People's Republic of China on Jun. 19, 2025, in corresponding Application No. CN 202180003030.6, 8 pages.

* cited by examiner

Terminal

Terminal

Network Device

SRS resource area

Slot

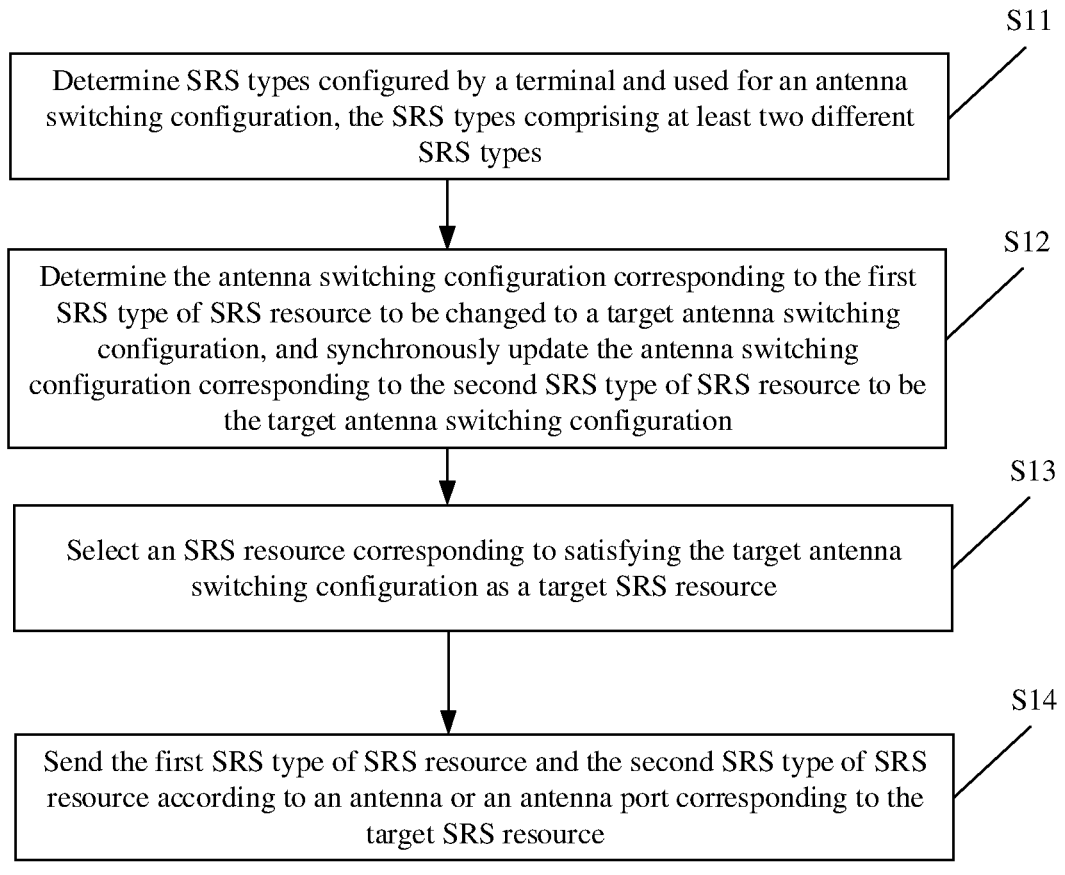

S11

Determine SRS types configured by a terminal and used for an antenna switching configuration, the SRS types comprising at least two different SRS types

S12

Determine the antenna switching configuration corresponding to the first SRS type of SRS resource to be changed to a target antenna switching configuration, and synchronously update the antenna switching configuration corresponding to the second SRS type of SRS resource to be the target antenna switching configuration

S13

Select an SRS resource corresponding to satisfying the target antenna switching configuration as a target SRS resource

S14

Send the first SRS type of SRS resource and the second SRS type of SRS resource according to an antenna or an antenna port corresponding to the target SRS resource

Receive first indication information, and the first indication information indicates that antenna switching configurations corresponding to at least two different SRS types are allowed to be updated synchronously as the target antenna switching configuration

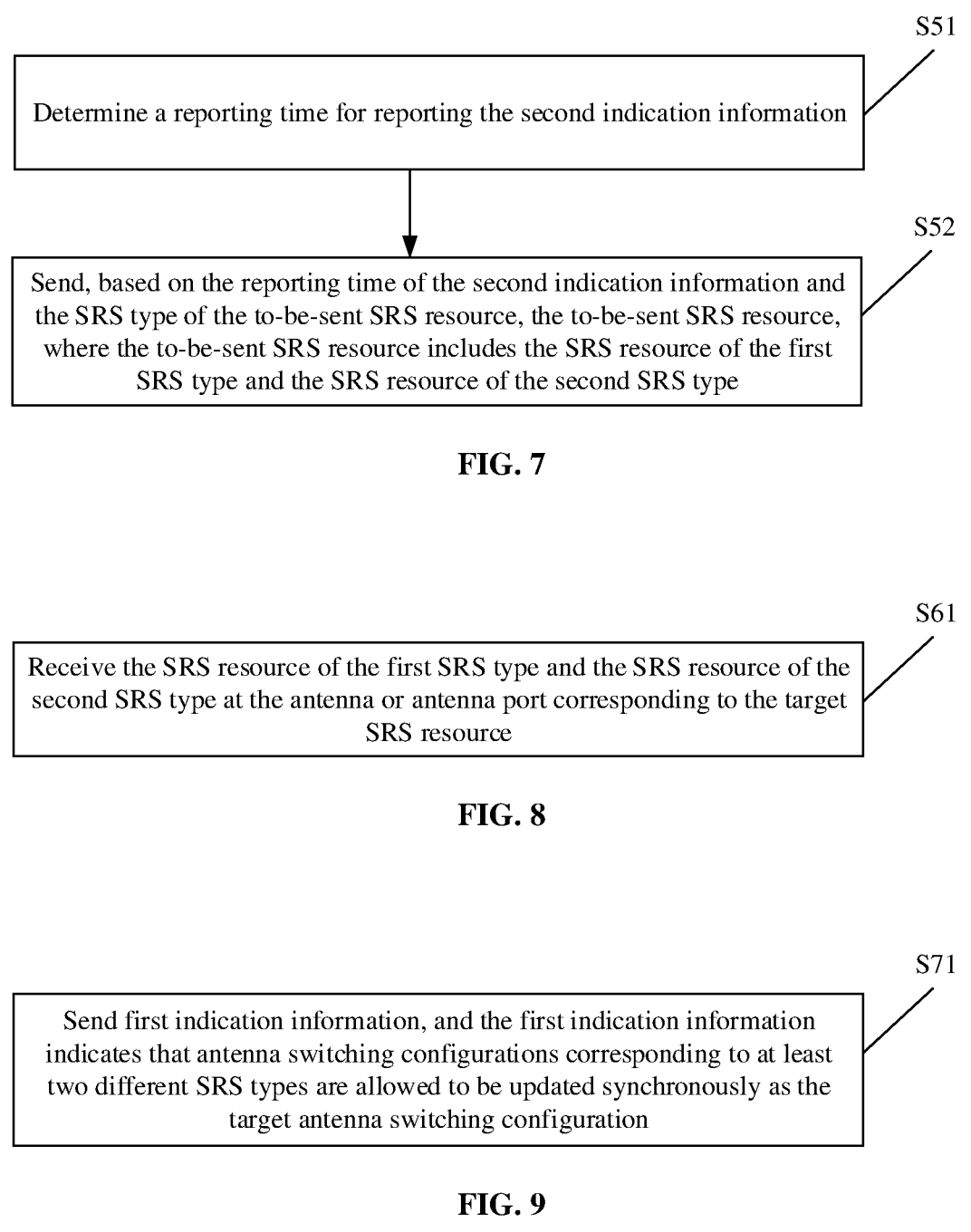

Determine a reporting time for reporting the second indication information

S52

Send, based on the reporting time of the second indication information and the SRS type of the to-be-sent SRS resource, the to-be-sent SRS resource, where the to-be-sent SRS resource includes the SRS resource of the first SRS type and the SRS resource of the second SRS type

Receive the SRS resource of the first SRS type and the SRS resource of the second SRS type at the antenna or antenna port corresponding to the target SRS resource

Send first indication information, and the first indication information indicates that antenna switching configurations corresponding to at least two different SRS types are allowed to be updated synchronously as the target antenna switching configuration

FIG. 9

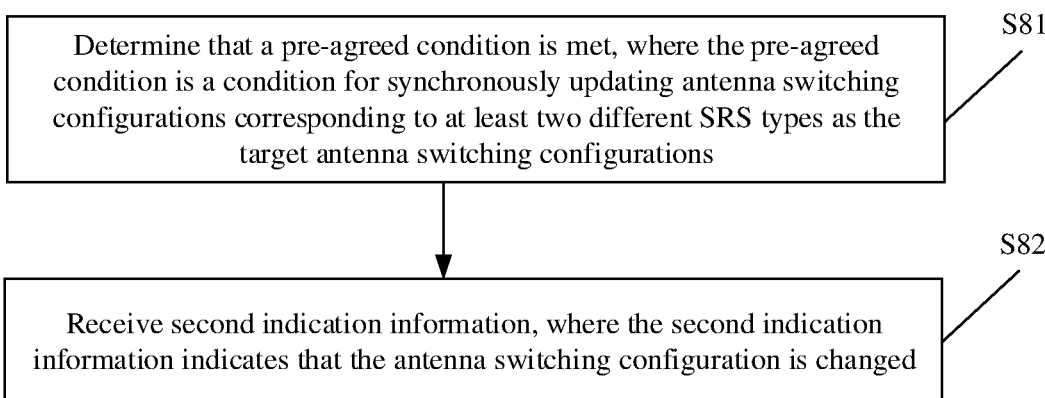

Determine that a pre-agreed condition is met, where the pre-agreed condition is a condition for synchronously updating antenna switching configurations corresponding to at least two different SRS types as the target antenna switching configurations

S81

Receive second indication information, where the second indication information indicates that the antenna switching configuration is changed

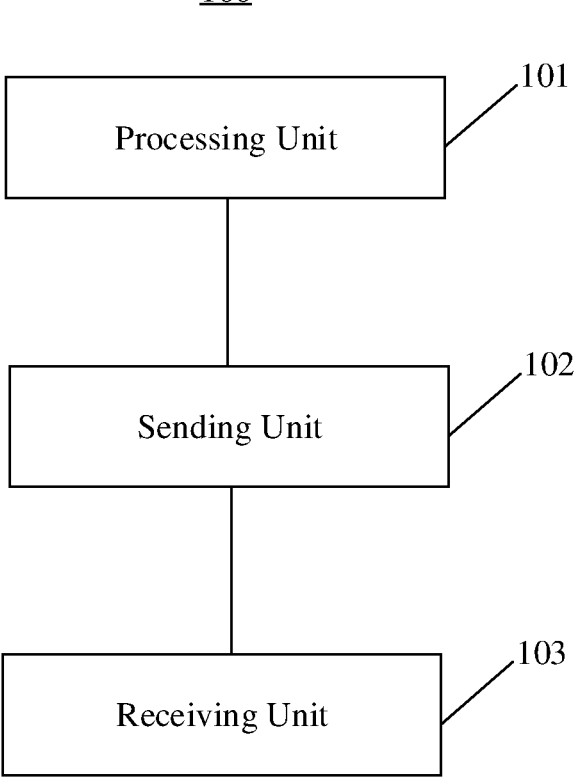

Processing Unit    101

Sending Unit    102

Receiving Unit    103

SRS SENDING METHOD AND APPARATUS FOR ANTENNA SWITCHING CONFIGURATION, AND STORAGE MEDIUM

CROSS REFERENCE TO RELATED APPLICATION

This application is the US national stage application of International Application No. PCT/CN2021/120011, filed on Sep. 23, 2021, which is incorporated by reference herein in its entirety.

TECHNICAL FIELD

This disclosure relates to the field of communication technologies, and in particular to a method and an apparatus for sending SRS used for antenna switching configuration as well as a storage medium.

BACKGROUND

In order to support effective acquisition of downlink information through channels under various terminal transceiver capabilities, different antenna switching configurations are provided for terminals in the communication system. Different antenna switching configurations correspond to different sounding reference signal (SRS) resources.

SUMMARY

In order to overcome the problems existing in related art, this disclosure provides a method and an apparatus for sending SRS used for antenna switching configuration as well as a storage medium.

According to a first aspect of embodiments of this disclosure, there is provided a method for sending SRS used for antenna switching configuration, which is applied to a terminal and includes: determining an SRS type configured by the terminal for antenna switching configuration, where the SRS type includes at least two different SRS types; determining that an antenna switching configuration corresponding to an SRS resource of a first SRS type is changed to a target antenna switching configuration, and synchronously updating an antenna switching configuration corresponding to an SRS resource of a second SRS type as the target antenna switching configuration, where the second SRS type includes all of the at least two different SRS types other than the first SRS type; selecting an SRS resource corresponding to the target antenna switching configuration as a target SRS resource; and sending the SRS resource of the first SRS type and the SRS resource of the second SRS type based on an antenna or an antenna port corresponding to the target SRS resource.

According to a second aspect of embodiments of this disclosure, there is provided a method for sending SRS used for antenna switching configuration, which is applied to a network device and includes:

receiving an SRS resource of a first SRS type and an SRS resource of a second SRS type at an antenna or an antenna port corresponding to a target SRS resource; where an antenna switching configuration corresponding to the SRS resource of the second SRS type is a target antenna switching configuration changed from an antenna switching configuration corresponding to the SRS resource of the first SRS type, the second SRS type includes all of at least two different SRS types other than the first SRS type, and the target SRS resource conforms to SRS resources corresponding to the target antenna switching configuration.

According to a third aspect of embodiments of this disclosure, there is provided an apparatus for sending SRS used for antenna switching configuration, including:

a processing unit, configured to determine an SRS type configured by a terminal for antenna switching configuration, where the SRS type includes at least two different SRS types; determine that an antenna switching configuration corresponding to an SRS resource of a first SRS type is changed to a target antenna switching configuration, and synchronously update an antenna switching configuration corresponding to an SRS resource of a second SRS type as the target antenna switching configuration, where the second SRS type includes all of the at least two different SRS types other than the first SRS type; and select an SRS resource corresponding to the target antenna switching configuration as a target SRS resource; and a sending unit, configured to send the SRS resource of the first SRS type and the SRS resource of the second SRS type based on an antenna or an antenna port corresponding to the target SRS resource.

According to a fourth aspect of embodiments of this disclosure, there is provided an apparatus for sending SRS used for antenna switching configuration, including:

a receiving unit, configured to receive an SRS resource of a first SRS type and an SRS resource of a second SRS type at an antenna or an antenna port corresponding to a target SRS resource; where an antenna switching configuration corresponding to the SRS resource of the second SRS type is a target antenna switching configuration changed from an antenna switching configuration corresponding to the SRS resource of the first SRS type, the second SRS type includes all of at least two different SRS types other than the first SRS type, and the target SRS resource conforms to SRS resources corresponding to the target antenna switching configuration.

According to a fifth aspect of embodiments of this disclosure, there is provided a device for sending SRS used for antenna switching configuration, including:

a processor; and a memory, configured to store an instruction executable by the processor;

where the processor is configured to implement the method for sending SRS used for antenna switching configuration according to the first aspect or any embodiment thereof.

According to a sixth aspect of embodiments of this disclosure, there is provided a device for sending SRS used for antenna switching configuration, including:

a processor; and a memory, configured to store an instruction executable by the processor;

where the processor is configured to implement the method for sending SRS used for antenna switching configuration according to the second aspect or any embodiment thereof.

According to a seventh aspect of embodiments of this disclosure, there is provided a storage medium storing an instruction thereon, where the instruction is used for, when being executed by a processor of a terminal, causing the terminal to implement the method for sending SRS used for antenna switching configuration according to the first aspect or any embodiment thereof.

According to an eighth aspect of embodiments of this disclosure, there is provided a storage medium storing an instruction thereon, where the instruction is used for, when being executed by a processor of a network device, causing the network device to implement the method for sending SRS used for antenna switching configuration according to the second aspect or any embodiment thereof.

It is to be understood that both the foregoing general description and the following detailed description are exemplary and explanatory only and are not restrictive of this disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

FIG. 3 is a flow chart showing a method for sending SRS used for antenna switching configuration according to some embodiments.

FIG. 4 is a flow chart showing a method for sending SRS used for antenna switching configuration according to some embodiments.

FIG. 7 is a flow chart showing a method for sending SRS used for antenna switching configuration according to some embodiments.

FIG. 8 is a flow chart showing a method for sending SRS used for antenna switching configuration according to some embodiments.

FIG. 9 is a flow chart showing a method for sending SRS used for antenna switching configuration according to some embodiments.

FIG. 10 is a flow chart showing a method for sending SRS used for antenna switching configuration according to some embodiments.

FIG. 11 is a block diagram showing an apparatus for sending SRS used for antenna switching configuration according to some embodiments.

DETAILED DESCRIPTION

Reference will now be made in detail to the exemplary embodiments, examples of which are illustrated in the accompanying drawings. When the following description refers to the accompanying drawings, the same numerals in different drawings refer to the same or similar elements unless otherwise indicated. The embodiments described in the following exemplary examples do not represent all embodiments consistent with this disclosure. Rather, they are merely examples of apparatuses and methods consistent with aspects of this disclosure as recited in the appended claims.

Figure 1:
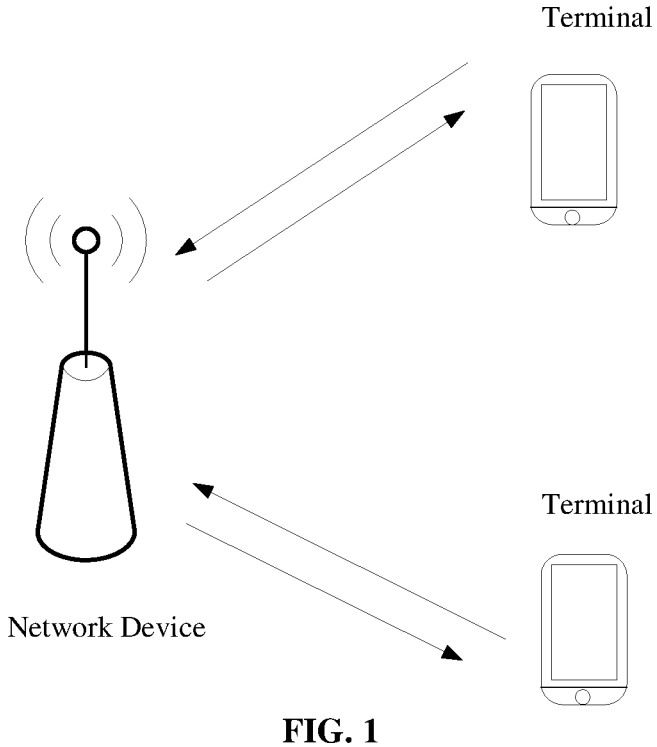
FIG. 1 is a schematic diagram of a wireless communication system according to some embodiments.

The method for sending SRS used for antenna switching configuration according to some embodiments of this disclosure may be applied to the wireless communication system shown in FIG. 1. Referring to FIG. 1, the wireless communication system includes a network device and terminals. The terminals are connected to the network device and perform data transmission through radio resources.

It can be understood that the wireless communication system shown in FIG. 1 is only for schematic illustration, and the wireless communication system may also include other network devices, such as core network devices, wireless relay devices, wireless backhaul devices and the like, which are not shown in FIG. 1. The embodiments of this disclosure do not limit the number of network devices and terminals included in the wireless communication system.

It can be further understood that the wireless communication system in some embodiments of this disclosure is a network that provides a wireless communication function. The wireless communication system can be achieved by using different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to the capacity, speed, delay and other factors of different networks, the networks may be divided into 2G ($2^{nd}$ generation) network, 3G network, 4G network or future evolution network, such as 5G network. 5G network can also be referred to as New Radio (NR). For convenience of description, this disclosure sometimes simply refers to the wireless communication network as a network.

Further, the network device involved in this disclosure may also be referred to as a radio access network device. The radio access network device may be: a base station, an evolved node B (eNB), a home base station, an access point (AP) in a wireless fidelity (WIFI) system, a wireless relay node, a wireless backhaul node, a transmission point (TP), a transmission and reception point (TRP), or the like; or may also be a gNB in the NR system; or may also be a component or a part of equipment that constitutes a base station. It should be understood that in the embodiments of this disclosure, no limitation is imposed on the specific technology and specific device form adopted by the network device. In this disclosure, the network device can provide communication coverage for a specific geographical area, and can communicate with terminals located in the coverage area (cell). In addition, when a vehicle-to-everything (V2X) communication system is concerned, the network device may also be a vehicle-mounted device.

Further, the terminals involved in this disclosure may also be referred to as terminal device, user equipment (UE), mobile station (MS), mobile terminal (MT), or the like, which is a device providing voice and/or data connectivity. For example, the terminal may be a handheld device with a wireless connection function, a vehicle-mounted device, and the like. At present, some examples of the terminal include: mobile phone, customer premise equipment (CPE), pocket personal computer (PPC), PDA, personal digital assistant (PDA), laptops, tablets, wearable devices, vehicle-mounted devices, and the like. In addition, when the V2X communication system is concerned, the terminal device may also be a vehicle-mounted device. It should be understood that the embodiments of this disclosure do not limit the specific technology and specific device form adopted by the terminal.

In related art, multiple transmitting antennas and receiving antennas are used at the transmitting end and the receiving end respectively, so that signals can be transmitted and received through the multiple antennas at the transmitting end and the receiving end. Multi-transmission and multi-reception can be realized through multiple antennas. Without increasing spectrum resources and antenna transmission power, the system channel capacity can be doubled, and the data throughput and signal-to-noise ratio can be improved, thereby improving system performance and communication quality.

In order to support effective acquisition of downlink information through channels under various terminal transceiver capabilities, different antenna switching configurations are provided for terminals in the communication system. Antenna switching capabilities of terminals defined by R15/16 can be divided into: the number of receiving antennas and the number of transmitting antennas are the same (i.e., T=R); and the receiving antennas are more than the transmitting antennas (i.e., R>T). In related art, as to the case of T=R supported by the current protocol, the terminal antenna switching capabilities mainly include one transmission and one reception (1T1R), two transmissions and two receptions (2T2R), and four transmissions and four receptions (4T4R). In the case of R>T, that is, there are more receiving antennas than transmitting antennas, following situations are included: one transmission and two receptions (1T2R), one transmission and four receptions (1T4R), and two transmissions and four receptions (2T4R).

Herein, the antenna switching capabilities supported by terminals in R15 are: 1T2R, 1T4R, 2T4R, 1T4R-2T4R, 1T1R, 2T2R, and 4T4R.

The antenna switching capabilities supported by terminals in R16 are: 1T1R-1T2R, 1T1R-1T2R-1T4R, 1T1R-1T2R-2T2R-2T4R, 1T1R-1T2R-2T2R-1T4R-2T4R, 1T1R-2T2R, and 1T1R-2T2R-4T4R.

Currently, in the research of R17, it is considered that the number of antennas of the terminal needs to be further increased, so the number of antennas will be further increased to a maximum of 6 antennas or a maximum of 8 antennas. The typical antenna configurations currently defined are {1T6R, 1T8R, 2T6R, 2T8R, [4T6R], 4T8R}, as shown in Table 1 below.

TABLE 1

| SRS antenna switching combinations up to 8 antennas | | |
|---|---|---|
| Tx\Rx | 6Rx | 8Rx |
| 1T | 1T6R | 1T8R |
| 2T | 2T6R | 2T8R |
| 4T | 4T6R | 4T8R |

In the related art, the sounding reference signal (SRS) used for antenna switching configuration is configured, where different antenna switching configurations correspond to different SRSs. The SRS for antenna switching configuration supported in the current protocol has the following situations.

(1) For a terminal with the same numbers of transmitting and receiving antennas (T=R), the network device may configure at most two SRS resource sets, and there is only one SRS resource in each set, and the number of ports therein is equal to the number of transmitting antennas of the terminal. One of the two SRS resource sets may be configured as periodic, and the other may be configured as aperiodic.

(2) For a terminal with capability of one transmission and two reception (1T2R), the network device may configure at most two SRS resource sets. There are two SRS resources in each set, and each SRS resource is provided with only one port.

(3) For a terminal with capability of two transmission and four reception (2T4R), the network device may configure at most two SRS resource sets. There are two SRS resources in each set, and each SRS resource is provided with two ports.

(4) For a terminal with capability of one transmission and four reception (1T4R), special consideration needs to be given to the configuration of SRS resources by the network device. Periodic or semi-persistent SRS resource can only be configured with one resource set at most, in which there are four SRS resources each provided with one port. Aperiodic SRS resource can be configured with a maximum of two SRS resource sets, there are a total of 4 SRS resources in the two SRS resource sets, and these 4 resources are sent in two slots and are sent by different physical antennas. Two resource sets may be configured with 2 resources for each set, or one set with 1 and the other with 3 resources; and each resource is provided with only 1 port.

In the 5G NR system, the triggering of SRS resources may include periodic/semi-persistent/aperiodic SRS resource configuration triggering mechanisms.

In some embodiments, all the parameters of the periodic SRS (P-SRS) are configured by high-layer signaling, and after the configuration is performed through the high-layer signaling, the terminal performs periodic transmission according to the configured parameters. All parameters of semi-persistent SRS (SP-SRS) are also configured by high-layer signaling. The difference between SP-SRS and P-SRS is that, for SP-SRS, although the corresponding parameters have been configured, the terminal cannot send SRS before receiving an activation instruction. Once activated, the terminal starts to send SRS, and stops sending SRS upon receiving a deactivation instruction sent by the network device. The activation and deactivation instructions of SP-SRS are sent from the MAC layer and, thus, are MAC CE instructions.

The aperiodic SRS resource (AP-SRS) trigger is triggered by the SRS request in the downlink control signaling (DCI). Table 2 illustrates the specific trigger signaling.

TABLE 2

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an | SRS resource set(s) configured with higher layer parameter usage in SRS-ResourceSet set to 'antennaSwitching' and resourceType in SRS-ResourceSet set to 'aperiodic' for a 1$^{st}$ set of |

7

TABLE 2-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
| --- | --- | --- |
| | entry in aperiodicSRS-ResourceTriggerList set to 1 when triggered by DCI formats 0_1, 0_2, 1_1, and 1_2 | serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

Figure 2:
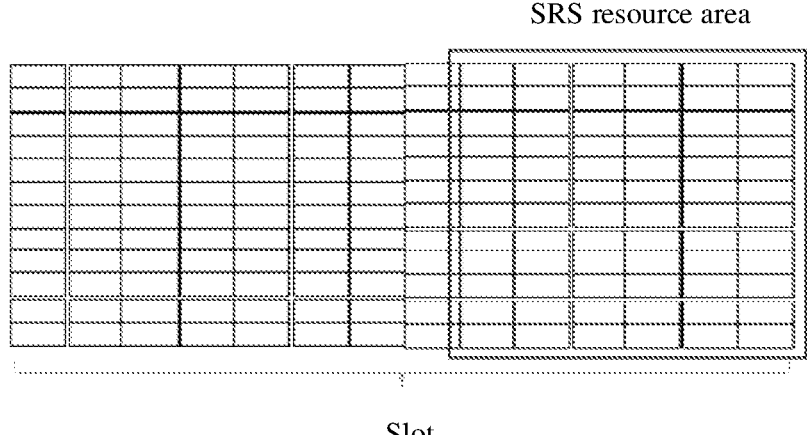
FIG. 2 is a schematic diagram showing an SRS mapping area in a time slot according to some embodiments.

In related art, the uplink SRS may be P-SRS, SP-SRS or AP-SRS, may be in narrowband or broadband, and may be provided with single port or multiport. The uplink SRS parameters are configured by the network device to the terminal, and include the number of ports, resource locations in the frequency domain, resource locations in the time domain, sequences, sequence cycle offsets, and the like. In the 5G NR system, SRS is mapped on up to six symbols of an uplink slot, as shown in FIG. 2, which shows the SRS mapping area within a slot.

In some embodiments, the network device can configure multiple uplink SRS sets for the terminal, and each resource set includes one or more SRS resources. One SRS resource may be on N consecutive OFDM symbols, and N can occupy 1, 2, or 4 symbols.

In the R15/16 NR system, network devices such as base stations are supported to communicate through channels to obtain downlink channel information, so as to improve downlink data transmission performance. In order to support the gNB to effectively obtain downlink information through channel communication under various transceiver capabilities of terminals, the SRS reference signal is specially designed in the NR system.

Furthermore, in order to adapt to the current service or scenario, the terminal may need to change the antenna configuration, for example, from 2T4R to 1T4R or 2T2R, or from 2T2R to 4T4R, then it is necessary to switch the antenna switching configuration.

In the related art, the switching of the antenna switching configuration by the terminal supports the switching of the antenna switching configuration for a certain type of SRS. For example, a 4T8R terminal can turn off the transmit link (Tx chain) to achieve power saving requirements by, for example, switching to 2T8R or 1T8R. However, for a certain antenna switching configuration, when SRS resources corresponding to the antenna switching configuration are dynamically switched, the SRS resources may not be updated synchronously. For example, if A-SRS or SP-SRS is dynamically switched based on network configuration to obtain an updated antenna switching configuration, the terminal may still have P/SP-SRS or A-SRS/P-SRS in the previous antenna switching configuration. When the SRS resources cannot be updated synchronously, it may result in that a switch of the transmit link or the receive link (Tx/Rx RF chain) cannot be actually turned off, thereby failing to completely solve power-saving needs and the like of terminals.

Embodiments of this disclosure provides a method for sending SRS used for antenna switching configuration. In this method, the SRS types configured by the terminal for antenna switching configuration include at least two different SRS types. In at least two different SRS types, there are SRS resources of an SRS type with changed antenna switching configuration, and the antenna switching configurations corresponding to SRS resources of all SRS type in the at least two different SRS types are updated synchronously.

In the embodiments of this disclosure, for convenience of description, the SRS type corresponding to the SRS resource whose antenna switching configuration is changed is referred to as the first SRS type hereinafter. In the at least two different SRS types configured by the terminal, the SRS types other than the first SRS type are referred to as the second SRS type.

FIG. 3 is a flowchart showing a method for sending SRS used for antenna switching configuration according to some embodiments. As shown in FIG. 3, the method for sending SRS used for antenna switching configuration is used in a terminal and includes the following steps.

In step S11, an SRS type configured by the terminal for antenna switching configuration is determined, and the SRS type includes at least two different SRS types.

In step S12, it is determined that an antenna switching configuration corresponding to an SRS resource of the first SRS type is changed to a target antenna switching configuration, and an antenna switching configuration corresponding to an SRS resource of the second SRS type is updated synchronously to the target antenna switching configuration. Herein, the second SRS type includes all other SRS types different from the first SRS type among at least two different SRS types.

In step S13, an SRS resource corresponding to the target antenna switching configuration is selected as a target SRS resource.

In step S14, the SRS resource of the first SRS type and the SRS resource of the second SRS are sent according to an antenna or an antenna port corresponding to the target SRS resource.

In some embodiments of this disclosure, the SRS types configured by the terminal for antenna switching configuration include at least two SRS types among P-SRS resources, SP-SRS resources and AP-SRS resources.

Herein, the SRS resource of the first SRS type and the SRS resource of the second SRS type are SRS resources of different SRS types.

In some embodiments, the SRS resource of the first SRS type is AP-SRS resource, and the SRS resource of the second SRS type is P-SRS resource or SP-SRS resource. Alternatively, the SRS resource of the first SRS type is AP-SRS resource or SP-SRS resource, and the SRS resource of the second SRS type is P-SRS resource.

In some other embodiments, the SRS resource of the first SRS type is P-SRS resource, and the SRS resource of the second SRS type is AP-SRS resource or SP-SRS resource. Alternatively, the SRS resource of the first SRS type is P-SRS resource or SP-SRS resource, and the SRS resource of the second SRS type is AP-SRS resource.

In some embodiments of this disclosure, the antenna switching configuration corresponding to the SRS resource of the first SRS type is changed to the target antenna switching configuration, and the antenna switching configuration corresponding to the SRS resource of the second SRS type is updated synchronously to the target antenna switching configuration.

In an example, the SRS resource of the first SRS type is AP-SRS, and the SRS resource of the second SRS type is P-SRS/SP-SRS. When the antenna switching configuration corresponding to AP-SRS is changed, the antenna switching configuration of P-SRS/SP-SRS will be updated synchronously, and the SRS resource in the corresponding SRS resource configuration will be selected to keep that the same Tx/Rx antenna(s) or Tx/Rx antenna port(s) as AP-SRS will be used. Alternatively, the SRS resource of the first SRS type is SP-SRS/AP-SRS, and the SRS resource of the second SRS type is P-SRS. When the antenna switching configuration corresponding to SP-SRS/AP-SRS is changed, the antenna switching configuration of P-SRS will be updated synchronously, and the SRS resource in the corresponding SRS resource configuration will be selected to keep that the same Tx/Rx antenna(s) or Tx/Rx antenna port(s) as SP-SRS/AP-SRS will be used.

In another example, the SRS resource of the first SRS type is P-SRS, and the SRS resource of the second SRS type is AP-SRS/SP-SRS. When the antenna switching configuration corresponding to P-SRS is changed, the antenna switching configuration of AP-SRS/SP-SRS is updated synchronously, the SRS resource in the corresponding SRS resource configuration is selected to ensure that the same Tx/Rx antenna(s) or Tx/Rx antenna port(s) as P-SRS is used. Alternatively, the SRS resource of the first SRS type is P-SRS/SP-SRS, and the SRS resource of the second SRS type is AP-SRS. When the antenna switching configuration corresponding to P-SRS/SP-SRS is changed, the antenna switching configuration of AP-SRS is updated synchronously, and the SRS resource in the corresponding SRS resource configuration is selected to ensure that the same Tx/Rx antenna(s) or Tx/Rx antenna port(s) as P-SRS/SP-SRS is used.

In some embodiments of this disclosure, the terminal synchronously updates the antenna switching configurations corresponding to different SRS types. On one hand, in case that the network device allows synchronous updating of antenna switching configurations corresponding to different SRS types, the antenna switching configurations corresponding to different SRS types can be synchronous updated to the target antenna switching configuration. In some embodiments, the network may instruct the terminal through signaling to allow the synchronous adaptive updating/synchronization of all configuration types to use the same antenna switching configuration for transmission. For the convenience of description, the indication information, which indicates that the antenna switching configurations corresponding to at least two different SRS types are allowed to be updated synchronously as the target antenna switching configuration, is referred to as the first indication information. The network device sends the first indication information to the terminal, indicating that the antenna switching configurations corresponding to at least two different SRS types are allowed to be updated synchronously as the target antenna switching configuration. The terminal receives the first indication information, and synchronously updates the antenna switching configurations corresponding to the at least two different SRS types as the target antenna switching configuration.

FIG. 4 is a flow chart of a method for sending SRS used for antenna switching configuration according to some embodiments. The method for sending SRS used for antenna switching configuration may be executed alone or in combination with other embodiments. As shown in FIG. 4, the method for sending SRS used for antenna switching configuration is used in a terminal, and includes the following steps.

In step S21, first indication information is received, and the first indication information indicates that antenna switching configurations corresponding to at least two different SRS types are allowed to be updated synchronously as the target antenna switching configuration.

In some embodiments of this disclosure, the first indication information in some embodiments of this disclosure may include at least one of the following:

radio resource control (RRC) information, a media access control (MAC) control element (CE), downlink control information (DCI), and grant controller (GC) DCI.

In some embodiments of this disclosure, on the other hand, the terminal can adaptively select, according to a predefined manner and agreement with the network, a corresponding SRS resource within configured SRS resource configuration range of different SRS types, which is to be used for sending the corresponding type of SRS.

Figure 5:
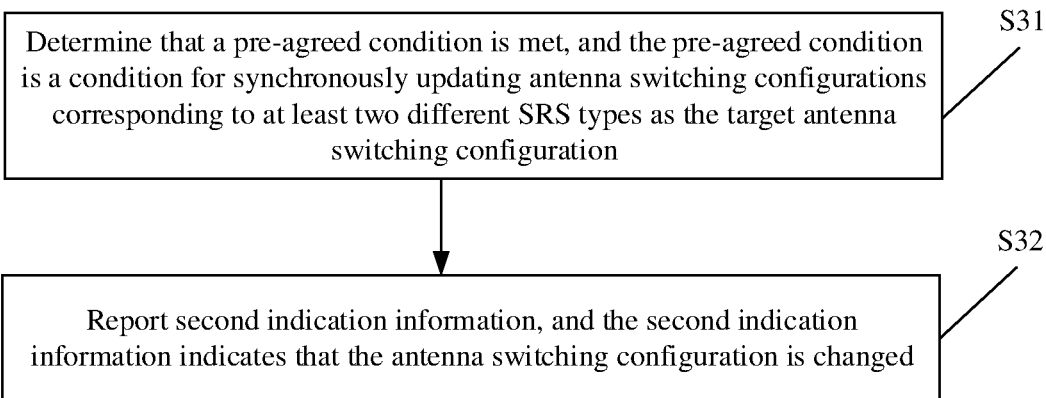
FIG. 5 is a flow chart showing a method for sending SRS used for antenna switching configuration according to some embodiments.

FIG. 5 is a flow chart of an method for sending SRS used for antenna switching configuration according to some embodiments. The method for sending SRS used for antenna switching configuration may be executed alone or in combination with other embodiments. As shown in FIG. 5, the method for sending SRS used for antenna switching configuration is used in a terminal, and includes the following steps.

In step S31, it is determined that a pre-agreed condition is met, and the pre-agreed condition is a condition for synchronously updating antenna switching configurations corresponding to at least two different SRS types as the target antenna switching configuration.

In step S32, second indication information is reported, and the second indication information indicates that the antenna switching configuration is changed.

In some embodiments of this disclosure, the pre-agreed condition may be pre-agreed based on the power saving requirement of the terminal, changes in the multiplexing situation of the terminal antenna(s), and the like. For example, based on the power saving requirement, the terminal determines that the pre-agreed condition of the power saving requirement is satisfied, changes the antenna switching configuration, and reports the second indication information, indicating that the antenna switching configuration is changed based on the power saving requirement. The network device receives the second indication information, determines that the terminal changes the antenna switching configuration based on the power saving requirement, and then implements a synchronous acknowledgement on the change of antenna switching configuration.

In some embodiments of this disclosure, the second indication information may include at least one of RRC, MAC CE, DCI, and GC-DCI.

In some embodiments of this disclosure, the terminal synchronously updates the antenna switching configurations of SRS resources of different SRS types to the target antenna switching configuration, and selects the SRS resource corresponding to the target antenna switching configuration as the target SRS resource. In some embodiments, for each SRS type in the at least two different SRS types, all or part of the SRS resources conforming to the target antenna switching configuration in the SRS resource configuration corresponding to the each SRS type are reselected as the target SRS resource.

In some embodiments of this disclosure, the SRS resource of the first SRS type and the SRS resource of the second SRS type are sent according to the antenna or antenna port corresponding to the target SRS resource.

In some embodiments of this disclosure, the terminal sends the SRS resource of the first SRS type and the SRS resource of the second SRS type according to the antenna or antenna port corresponding to the target SRS resource, and the SRS resource of the first SRS type and the SRS resource of the second SRS types may be sent in different manners based on different update methods.

In some embodiments, based on the first indication information, the terminal synchronously updates the antenna switching configurations of SRS resources of different SRS types to the target antenna switching configuration, and sends the SRS resource of the first SRS type and the SRS resource of the second SRS type. The terminal may send the to-be-sent SRS resource based on the change time when the antenna switching configuration is changed and the SRS type of the to-be-sent SRS resource.

Figure 6:
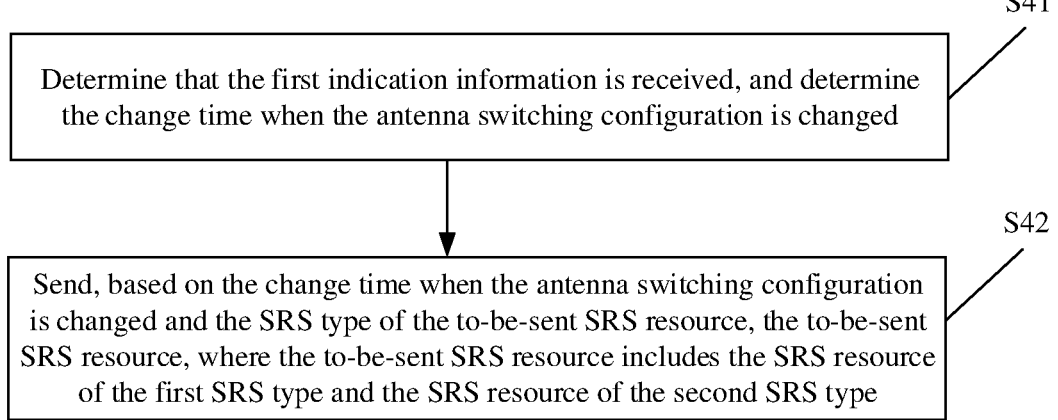
FIG. 6 is a flow chart showing a method for sending SRS used for antenna switching configuration according to some embodiments.

FIG. 6 is a flow chart of a method for sending SRS used for antenna switching configuration according to some embodiments. The method for sending SRS used for antenna switching configuration may be executed alone or in combination with other embodiments. As shown in FIG. 6, the method for sending SRS used for antenna switching configuration is used in a terminal, and includes the following steps.

In step S41, it is determined that the first indication information is received, and the change time when the antenna switching configuration is changed is determined.

In step S42, based on the change time when the antenna switching configuration is changed and the SRS type of the to-be-sent SRS resource, the to-be-sent SRS resource is sent, where the to-be-sent SRS resource includes the SRS resource of the first SRS type and the SRS resource of the second SRS type.

In some embodiments, the SRS type of the to-be-sent SRS resource is P-SRS resource or AP-SRS resource, and the to-be-sent SRS resource is sent at the change time when the antenna switching configuration is changed.

In some other embodiments, the SRS type of the to-be-sent SRS resource is SP-SRS resource, and at least one of the following manners is used to send the to-be-sent SRS resource.

In manner A, sending of the to-be-sent SRS resource is started at the change time when the antenna switching configuration is changed. It can also be understood as that the SRS transmission is immediately applied when the antenna configuration is changed.

In manner B, in response to the change time when the antenna switching configuration is changed is in a sounding sending cycle in the SRS has already started, the to-be-sent SRS resource is sent at a start time of a next sounding sending cycle after a complete sounding is completed based on an SRS resource set corresponding to the sounding sending cycle. It can also be understood as that the SRS transmission is applied after a complete sounding of an SRS resource set.

In manner C, the to-be-sent SRS resource is uniformly sent in a next scheduling cycle after an SRS resource set scheduling cycle corresponding to the change time when the antenna switching configuration is changed. It can also be understood as a uniform change being aligned to the next P-SRS transmission time.

In some other embodiments, the terminal reports the second indication information based on the pre-agreed condition, and synchronously updates the antenna switching configurations corresponding to at least two different SRS types as the target antenna switching configuration. The to-be-sent SRS resource is sent based on the reporting time of the second indication information and the SRS type of the to-be-sent SRS resource.

FIG. 7 is a flow chart of a method for sending SRS used for antenna switching configuration according to some embodiments. The method for sending SRS used for antenna switching configuration may be executed alone or in combination with other embodiments. As shown in FIG. 7, the method for sending SRS used for antenna switching configuration is used in a terminal, and includes the following steps.

In step S51, a reporting time for reporting the second indication information is determined.

In step S52, based on the reporting time of the second indication information and the SRS type of the to-be-sent SRS resource, the to-be-sent SRS resource is sent, where the to-be-sent SRS resource includes the SRS resource of the first SRS type and the SRS resource of the second SRS type.

In some embodiments, the SRS type of the to-be-sent SRS resource is P-SRS resource or AP-SRS resource, and the to-be-sent SRS resource is sent at the reporting time of the second indication information.

In some embodiments, the SRS type of the to-be-sent SRS resource is SP-SRS resource, and at least one of the following manners is used to send the to-be-sent SRS resource.

In manner A, the to-be-sent SRS resource is sent at the reporting time of the second indication information. It can also be understood as that the SRS transmission is immediately applied at the reporting time of the second indication information.

In manner B, the to-be-sent SRS resource is sent at a start time of a next sounding cycle after sounding is completed based on an SRS resource set corresponding to the reporting time. It can also be understood as that the SRS transmission is applied after a complete sounding of an SRS resource set.

In manner C, the to-be-sent SRS resource is uniformly sent in a next scheduling cycle after an SRS resource set scheduling cycle corresponding to the reporting time of the second indication information. It can also be understood as a uniform change being aligned to the next P-SRS transmission time.

Based on the forgoing method for sending SRS used for antenna switching configuration applied to the terminal according to some embodiments of this disclosure, different types of SRS can be synchronized in certain scenarios or requirements, so as to ensure that, when transmitting SRS, the terminal can adaptively select the SRS resource for actual transmission by using the same Tx/Rx chain, thereby actually achieving terminal requirements such as power saving.

Based on the same concept, some embodiments of this disclosure further provide a method for sending SRS used for antenna switching configuration performed by a network device.

FIG. 8 is a flow chart of a method for sending SRS used for antenna switching configuration according to some embodiments. The method for sending SRS used for antenna switching configuration may be executed alone or in combination with other embodiments. As shown in FIG. 8, the method for sending SRS used for antenna switching configuration is used in a network device, and includes the following steps.

In step S61, the SRS resource of the first SRS type and the SRS resource of the second SRS type are received at the antenna or antenna port corresponding to the target SRS resource.

Herein, the antenna switching configuration corresponding to the SRS resource of the second SRS type is a target antenna switching configuration changed from an antenna switching configuration corresponding to the SRS resource of the first SRS type, the second SRS type includes all of at least two different SRS types other than the first SRS type, and the target SRS resource conforms to SRS resources corresponding to the target antenna switching configuration.

FIG. 9 is a flow chart showing a method for sending SRS used for antenna switching configuration according to some embodiments. The method for sending SRS used for antenna switching configuration may be performed alone or in combination with other embodiments. As shown in FIG. 9, the method for sending SRS used for antenna switching configuration is used in a network device, and includes the following steps.

In step S71, first indication information is sent, and the first indication information indicates that antenna switching configurations corresponding to at least two different SRS types are allowed to be updated synchronously as the target antenna switching configuration.

In some embodiments of this disclosure, the first indication information may include at least one of RRC, MAC CE, DCI, and GC-DCI.

In some embodiments, the network device receives the to-be-received SRS resource based on the change time when the antenna switching configuration is changed and the SRS type of the to-be-received SRS resource, where the to-be-received SRS resource includes the SRS resource of the first SRS type and the SRS resource of the second SRS type.

In some embodiments, on the one hand, the SRS type of the to-be-received SRS resource is P-SRS resource or AP-SRS resource, and the to-be-received SRS resource is received at the change time. On the other hand, the SRS type of the to-be-received SRS resource is SP-SRS resource, and at least one of the following manners is used to receive the to-be-received SRS resource.

In manner A, receiving of the to-be-received SRS resource is started at the changed time.

In manner B, in response to that the change time is in a sounding sending cycle in which SRS has already started, the to-be-received SRS resource is received at a start time of a next sounding sending cycle after a complete sounding is completed based on an SRS resource set corresponding to the sounding sending cycle.

In manner C, the to-be-sent SRS resource is uniformly received in a next scheduling cycle after an SRS resource set scheduling cycle corresponding to the change time.

FIG. 10 is a flow chart showing a method for sending SRS used for antenna switching configuration according to some embodiments. The method for sending SRS used for antenna switching configuration may be performed alone or in combination with other embodiments. As shown in FIG. 10, the method for sending SRS used for antenna switching configuration is used in network device, including the following steps.

In step S81, it is determined that a pre-agreed condition is met, where the pre-agreed condition is a condition for synchronously updating antenna switching configurations corresponding to at least two different SRS types as the target antenna switching configurations.

In step S82, second indication information is received, where the second indication information indicates that the antenna switching configuration is changed.

In some embodiments of this disclosure, the second indication information may include at least one of RRC, MAC CE, DCI, and GC-DCI.

In some embodiments, the network device determines a reporting time for receiving the second indication information. Based on the reporting time of the second indication information and the SRS type of the to-be-received SRS resource, the to-be-received SRS resource is received, where the to-be-received SRS resource includes the SRS resource of the first SRS type and the SRS resource of the second SRS type.

In some embodiments, the SRS type of the to-be-received SRS resource is P-SRS resource or AP-SRS resource, and the to-be-received SRS resource is received at the reporting time.

In some embodiments, the SRS type of the to-be-received SRS resource is SP-SRS resource, and at least one of the following manners is used to receive the to-be-received SRS resource.

In manner A, the to-be-received SRS resource is received at the reporting time of the second indication information.

In manner B, the to-be-received SRS resource is received at a start time of a next sounding cycle after sounding is completed based on an SRS resource set corresponding to the reporting time.

In manner C, the to-be-received SRS resource is uniformly received in a next scheduling cycle after an SRS resource set scheduling cycle corresponding to the reporting time.

On the one hand, in the method for sending SRS used for antenna switching configuration applied to the network device according to some embodiments of this disclosure, the SRS resource of the first SRS type is AP-SRS resource, and the SRS resource of the second SRS type is P-SRS resources or SP-SRS resource; or the SRS resource of the first SRS type is AP-SRS resource or SP-SRS resource, and the SRS resource of the second SRS type is P-SRS resource. On the other hand, in the method for sending SRS used for antenna switching configuration applied to the network device, the SRS resource of the first SRS type is P-SRS resource, and the SRS resource of the second SRS type is AP-SRS resource or SP-SRS resource; or the SRS resource of the first SRS type is P-SRS resource or SP-SRS resource, and the SRS resource of the second SRS type is AP-SRS resource.

It can be understood that some of the content involved in the implementation of sending SRS used for antenna switching configuration performed by the network device in the embodiments of this disclosure is similar to the execution process of sending SRS used for the antenna switching configuration performed by the terminal, and will not be repeated here in the embodiments of this disclosure. For places where the description is not detailed enough, the switching process of antenna switching configuration on the terminal side can be referred to.

It can be further understood that, the method for sending SRS used for antenna switching configuration according to some embodiments of this disclosure is applicable to interacting between the terminal and the network device to implement transmission of SRS for antenna switching configuration. During the interaction between the terminal and the network device to implement the transmission process of SRS for antenna switching configuration, the terminal has the functions of realizing the terminal involved in the above-mentioned embodiments, and the network device has the functions of realizing the network device involved in the above-mentioned embodiments. For details, the above-mentioned embodiments can be referred to, and relevant descriptions will not be described in detail here.

It should be noted that those skilled in the art can understand that the various implementation modes/embodiments mentioned above in the embodiments of this disclosure may be used in conjunction with the foregoing other embodiments, or may be used independently. Regardless of being used alone or in combination with the foregoing other embodiments, its implementation principles are similar. During the implementation of this disclosure, some embodiments are described in the manner of being used together. Those skilled in the art can understand that such description is not a limitation to the embodiments of this disclosure.

Based on the same concept, some embodiments of this disclosure further provide an apparatus for sending SRS used for antenna switching configuration.

It can be understood that, in order to realize the above functions, the apparatus for sending SRS used for antenna switching configuration according to some embodiments of this disclosure includes corresponding hardware structures and/or software modules for performing various functions. Combining the units and algorithm steps of each example disclosed in the embodiments of this disclosure, the embodiments of this disclosure may be implemented in the form of hardware or a combination of hardware and computer software. Whether a certain function is executed by hardware or computer software driving hardware depends on the specific application and design constraints of the technical solution. Those skilled in the art may use different methods to implement the described functions for each specific application, but such implementation should not be regarded as exceeding the scope of the technical solutions according to the embodiments of this disclosure.

FIG. 11 is a block diagram of an apparatus for sending SRS used for antenna switching configuration according to some embodiments. Referring to FIG. 11, the apparatus 100 for sending SRS used for antenna switching configuration is applied to a terminal, and includes a processing unit 101 and a sending unit 102.

The processing unit 101 is configured to determine an SRS type configured by a terminal for antenna switching configuration, where the SRS type includes at least two different SRS types; determine that an antenna switching configuration corresponding to an SRS resource of a first SRS type is changed to a target antenna switching configuration, and synchronously update an antenna switching configuration corresponding to an SRS resource of a second SRS type as the target antenna switching configuration, where the second SRS type includes all of the at least two different SRS types other than the first SRS type; and select an SRS resource corresponding to the target antenna switching configuration as a target SRS resource. The sending unit 102 is configured to send the SRS resource of the first SRS type and the SRS resource of the second SRS type based on an antenna or an antenna port corresponding to the target SRS resource.

In some embodiments, the apparatus 100 for sending SRS used for antenna switching configuration further includes a receiving unit 103, and the receiving unit 103 is configured to receive first indication information, where the first indication information indicates permission of synchronously updating antenna switching configurations corresponding to the at least two different SRS types as the target antenna switching configuration.

In some embodiments, the sending unit 102 is configured to send the SRS resource of the first SRS type and the SRS resource of the second SRS type in the following manner: determining that the receiving unit 103 receives the first indication information, determining a change time when the antenna switching configuration is changed; and sending a to-be-sent SRS resource based on the change time and an SRS type of the to-be-sent SRS resource, where the to-be-sent SRS resource includes the SRS resource of the first SRS type and the SRS resource of the second SRS type.

In some embodiments, the sending unit 102 is configured to send the to-be-sent SRS resource based on the change time and the SRS type of the to-be-sent SRS resource in a following manner: determining that the SRS type of the to-be-sent SRS resource is P-SRS resource or AP-SRS resource, and sending the to-be-sent SRS resource at the change time.

In some embodiments, the sending unit 102 is configured to send the to-be-sent SRS resource based on the change time and the SRS type of the to-be-sent SRS resource by determining that the SRS type of the to-be-sent SRS resource is SP-SRS resource, and sending the to-be-sent SRS resource in at least one of following manners: starting sending of the to-be-sent SRS resource at the change time; in response to that the change time is in a sounding sending cycle in which SRS has already started, sending, after a complete sounding is completed based on an SRS resource set corresponding to the sounding sending cycle, the to-be-sent SRS resource at a start time of a next sounding sending cycle; or uniformly sending the to-be-sent SRS resource in a next scheduling cycle after an SRS resource set scheduling cycle corresponding to the change time.

In some embodiments, the processing unit 101 is further configured to: determine that a pre-agreed condition is met, where the pre-agreed condition is a condition for synchronously updating antenna switching configurations corresponding to the at least two different SRS types as the target antenna switching configuration; and the sending unit 102 is further configured to report second indication information, where the second indication information indicates that the antenna switching configuration is changed.

In some embodiments, the sending unit 102 is configured to send the SRS resource of the first SRS type and the SRS resource of the second SRS type in a following manner: determining a reporting time for reporting the second indication information; and sending a to-be-sent SRS resource based on the reporting time and an SRS type of the to-be-sent SRS resource, where the to-be-sent SRS resource includes the SRS resource of the first SRS type and the SRS resource of the second SRS type.

In some embodiments, the sending unit 102 is configured to send the to-be-sent SRS resource based on the reporting time and an SRS type of the to-be-sent SRS resource in a following manner: determining that the SRS type of the to-be-sent SRS resource is P-SRS resource or AP-SRS resource, and sending the to-be-sent SRS resource at the reporting time.

In some embodiments, the sending unit 102 is configured to send the to-be-sent SRS resource based on the reporting time and an SRS type of the to-be-sent SRS resource by determining that the SRS type of the to-be-sent SRS resource is SP-SRS resource, and sending the to-be-sent SRS resource in at least one of the following manners: sending the to-be-sent SRS resource at the reporting time; sending the to-be-sent SRS resource at a start time of a next sounding cycle after sounding is completed based on an SRS resource set corresponding to the reporting time; or uniformly sending the to-be-sent SRS resource in a next scheduling cycle after an SRS resource set scheduling cycle corresponding to the reporting time.

In some embodiments, the processing unit 101 is configured to select the SRS resource corresponding to the target antenna switching configuration as the target SRS resource in a following manner:

for each SRS type in the at least two different SRS types, reselecting, in an SRS resource configuration corresponding to the each SRS type, all or part of SRS resources conforming to the target antenna switching configuration as the target SRS resource.

In some embodiments, the SRS resource of the first SRS type is AP-SRS resource, and the SRS resource of the second SRS type is P-SRS resource or SP-SRS resource; or the SRS resource of the first type is AP-SRS resource or SP-SRS resource, and the SRS resource of the second SRS type is a P-SRS resource.

In some embodiments, the SRS resource of the first SRS type is P-SRS resource, and the SRS resource of the second SRS type is AP-SRS resource or SP-SRS resource; or the SRS resource of the first type is P-SRS resource or SP-SRS resource, and the SRS resource of the second SRS type is AP-SRS resource.

In some embodiments, the first indication information or the second indication information includes at least one of the following: MAC CE, DCI, CG-DCI, and RRC.

Figure 12:
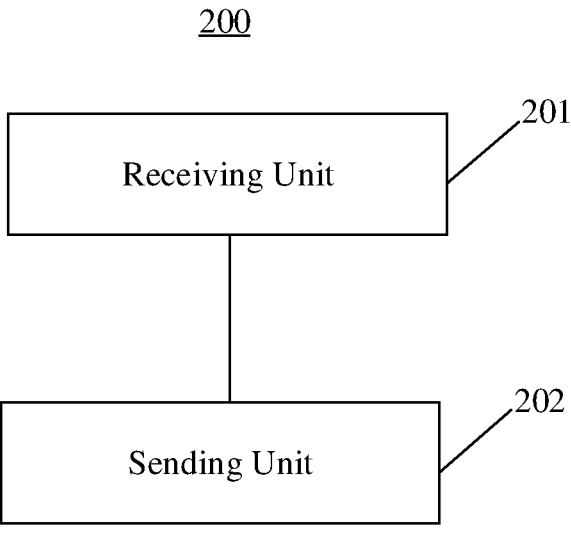
FIG. 12 is a block diagram showing an apparatus for sending SRS used for antenna switching configuration according to some embodiments.

FIG. 12 is a block diagram of an apparatus for sending SRS used for antenna switching configuration according to some embodiments. Referring to FIG. 12, the apparatus 200 for sending SRS used for antenna switching configuration is applied to a network device, including a receiving unit 201.

The receiving unit 201 is configured to receive an SRS resource of a first SRS type and an SRS resource of a second SRS type at an antenna or an antenna port corresponding to a target SRS resource; where an antenna switching configuration corresponding to the SRS resource of the second SRS type is a target antenna switching configuration changed from an antenna switching configuration corresponding to the SRS resource of the first SRS type, the second SRS type includes all of at least two different SRS types other than the first SRS type, and the target SRS resource conforms to SRS resources corresponding to the target antenna switching configuration.

In some embodiments, the apparatus 200 for sending SRS used for antenna switching configuration further includes a sending unit 202, and the sending unit 202 is configured to send first indication information, where the first indication information indicates permission of synchronously updating antenna switching configurations corresponding to the at least two different SRS types as the target antenna switching configuration.

In some embodiments, the receiving unit 201 is configured to receive the SRS resource of the first SRS type and the SRS resource of the second SRS type in a following manner:

receiving a to-be-received SRS resource based on a change time when the antenna switching configuration is changed and an SRS type of the to-be-received SRS resource, where the to-be-received SRS resource includes the SRS resource of the first SRS type and the SRS resource of the second SRS type.

In some embodiments, the receiving unit 201 is configured to receive the to-be-received SRS resource based on the change time when the antenna switching configuration is changed and the SRS type of the to-be-received SRS resource in a following manner: determining that the SRS type of the to-be-received SRS resource is P-SRS resource or AP-SRS resource, and receiving the to-be-received SRS resource at the change time.

In some embodiments, the receiving unit 201 is configured to receive the to-be-received SRS resource based on the change time when the antenna switching configuration is changed and the SRS type of the to-be-received SRS resource by determining that the SRS type of the to-be-received SRS resource is a SP-SRS resource, and receiving the to-be-received SRS resource in at least one of following manners: starting receiving of the to-be-received SRS resource at the change time; in response to that the change time is in a sounding sending cycle in which SRS has already started, receiving, after a complete sounding is completed based on an SRS resource set corresponding to the sounding sending cycle, the to-be-received SRS resource at a start time of a next sounding sending cycle; or uniformly receiving the to-be-sent SRS resource in a next scheduling cycle after an SRS resource set scheduling cycle corresponding to the change time.

In some embodiments, the receiving unit 201 is further configured to: determine that a pre-agreed condition is met, where the pre-agreed condition is a condition for synchronously updating antenna switching configurations corresponding to the at least two different SRS types as the target antenna switching configuration; and receive second indication information, where the second indication information indicates that the antenna switching configuration is changed.

In some embodiments, the receiving unit 201 is configured to receive the SRS resource of the first SRS type and the SRS resource of the second SRS type in a following manner:

determining a reporting time for receiving the second indication information; and receiving a to-be-received SRS resource based on the reporting time and an SRS type of the to-be-received SRS resource, where the to-be-received SRS resource includes the SRS resource of the first SRS type and the SRS resource of the second SRS type.

In some embodiments, the receiving unit 201 is configured to receive the to-be-received SRS resource based on the reporting time and the SRS type of the to-be-received SRS resource in a following manner: determining that the SRS type of the to-be-received SRS resource is P-SRS resource or AP-SRS resource, and receiving the to-be-received SRS resource at the reporting time.

In some embodiments, the receiving unit 201 is configured to receive the to-be-received SRS resource based on the reporting time and the SRS type of the to-be-received SRS resource by:

determining that the SRS type of the to-be-received SRS resource is SP-SRS resource, and receiving the to-be-received SRS resource in at least one of following manners: receiving the to-be-received SRS resource at the reporting time; receiving the to-be-received SRS resource at a start time of a next sounding cycle after sounding is completed based on an SRS resource set corresponding to the reporting time; or uniformly receiving the to-be-received SRS resource in a next scheduling cycle after an SRS resource set scheduling cycle corresponding to the reporting time.

In some embodiments, the SRS resource of the first SRS type is AP-SRS resource, and the SRS resource of the second SRS type is P-SRS resource or SP-SRS resource; or the SRS resource of the first SRS type is AP-SRS resource or SP-SRS resource, and the SRS resource of the second SRS type is P-SRS resource.

In some embodiments, the SRS resource of the first SRS type is P-SRS resource, and the SRS resource of the second SRS type is AP-SRS resource or SP-SRS resource; or the SRS resource of the first SRS type is P-SRS resource or SP-SRS resource, and the SRS resource of the second SRS type is AP-SRS resource.

In some embodiments, the first indication information or the second indication information includes at least one of the following: MAC CE, DCI, CG-DCI and RRC information.

Regarding the apparatus in the foregoing embodiments, the specific manner in which each module executes operations has been described in detail in the embodiments related to the method, and will not be described in detail here.

Figure 13:
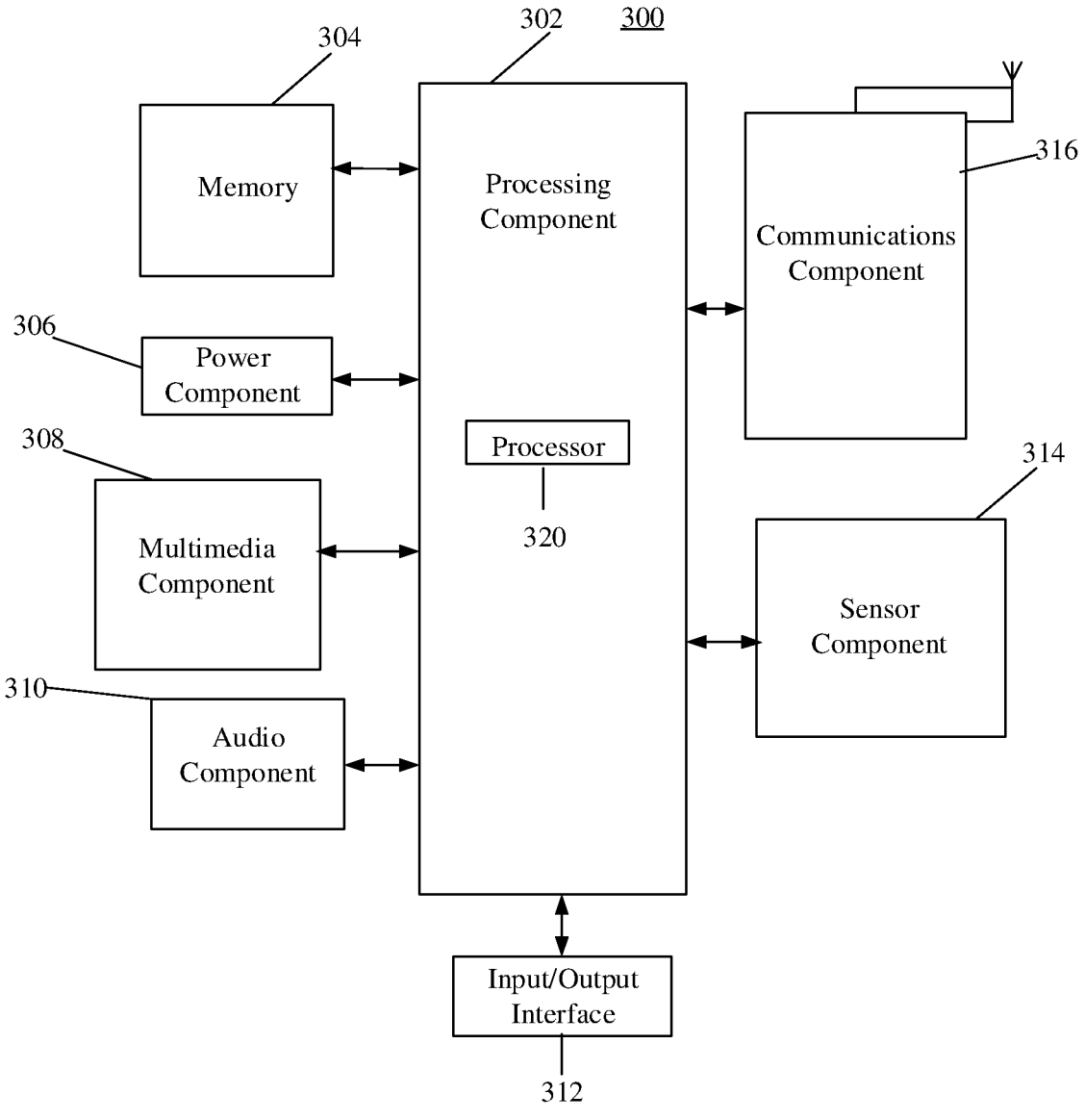
FIG. 13 is a block diagram showing a device for sending SRS used for antenna switching configuration according to some embodiments.

FIG. 13 is a block diagram showing a device for sending SRS used for antenna switching configuration according to some embodiments. For example, the device 300 may be provided as a terminal. The device 300 may be a mobile phone, a computer, a digital broadcast terminal, a messaging device, a game console, a tablet device, a medical device, a fitness device, a personal digital assistant, and the like.

Referring to FIG. 13, the device 300 may include one or more of the following components: processing component 302, memory 304, power component 306, multimedia component 308, audio component 310, input/output (I/O) interface 312, sensor component 314, and communication component 316.

The processing component 302 generally controls the overall operation of the device 300, such as operations associated with display, phone calls, data communications, camera operations, and recording operations. The processing component 302 may include one or more processors 320 to execute instructions to perform all or some of the steps of the methods described above. Additionally, the processing component 302 may include one or more modules that facilitate interaction between the processing component 302 and other components. For example, the processing component 302 may include a multimedia module to facilitate interaction between the multimedia component 308 and the processing component 302.

The memory 304 is configured to store various types of data to support operation at the device 300. Examples of such data include instructions, contact data, phonebook data, messages, pictures, videos, and the like for any application or method operating on the device 300. The memory 304 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic or optical disk.

The power component 306 provides power to various components of the device 300. The power components 306 may include a power management system, one or more power sources, and other components associated with generating, managing, and distributing power to the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 308 includes a front camera and/or a rear camera. When the device 300 is in an operation mode, such as a shooting mode or a video mode, the front camera and/or the rear camera may receive external multimedia data. Each of the front and rear cameras may be a fixed optical lens system or have focal length and optical zoom capability.

The audio component 310 is configured to output and/or input audio signals. For example, the audio component 310 includes a microphone (MIC) that is configured to receive external audio signals when the device 300 is in operating modes, such as calling mode, recording mode, and voice recognition mode. The received audio signal may be further stored in the memory 304 or transmitted via the communication component 316. In some embodiments, the audio component 310 also includes a speaker for outputting audio signals.

The I/O interface 312 provides an interface between the processing component 302 and a peripheral interface module, which may be a keyboard, a click wheel, a button, or the like. These buttons may include, but are not limited to: home button, volume buttons, start button, and lock button.

The sensor assembly 314 includes one or more sensors for providing status assessments of various aspects of the device 300. For example, the sensor assembly 314 can detect the open/closed state of the device 300, the relative positioning of components, such as the display and keypad of the device 300. The sensor assembly 314 can also detect a change in the position of the device 300 or a component of the device 300, the presence or absence of user contact with the device 300, the orientation or acceleration/deceleration of the device 300, and the temperature change of the device 300. The sensor assembly 314 may include a proximity sensor configured to detect the presence of nearby objects in the absence of any physical contact. The sensor assembly 314 may also include a light sensor, such as a CMOS or CCD image sensor, for use in imaging applications. In some embodiments, the sensor assembly 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 may access wireless networks based on communication standards, such as WiFi, 2G or 3G, or a combination thereof. In some embodiments, the communication component 316 receives broadcast signals or broadcast related information from an external broadcast management system via a broadcast channel. In some embodiments, the communication component 316 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some embodiments, the device 300 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component, which are configured to perform the forgoing methods.

In some embodiments, there is also provided a non-transitory computer-readable storage medium including instructions, such as the memory 304 including instructions, executable by the processor 320 of the device 300 to perform the method described above. For example, the non-transitory computer-readable storage medium may be ROM, random access memory (RAM), CD-ROM, magnetic tape, floppy disk, optical data storage device, and the like.

Figure 14:
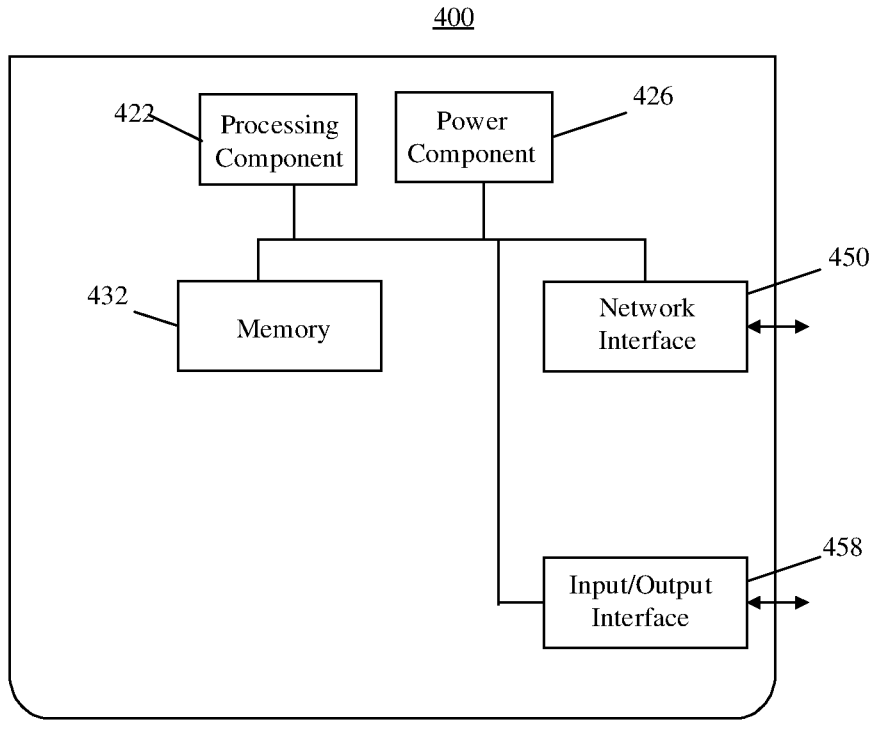
FIG. 14 is a block diagram showing a device for sending SRS used for antenna switching configuration according to some embodiments.

FIG. 14 is a block diagram showing a device for sending SRS used for antenna switching configuration according to some embodiments. For example, the device 400 may be provided as a network device. Referring to FIG. 14, the device 400 includes a processing component 422, which further includes one or more processors; and a memory resource represented by memory 432 for storing instructions executable by the processing component 422, such as application programs. The application program stored in memory 432 may include one or more modules each corresponding to a set of instructions. In addition, the processing component 422 is configured to execute instructions to perform the forgoing methods.

The device 400 may also include a power component 426 configured to perform power management of the device 400, a wired or wireless network interface 450 configured to connect the device 400 to a network, and an input-output (I/O) interface 458. The device 400 can operate based on an operating system stored in the memory 432, such as Windows Server™, Mac OS X™, Unix™, Linux™, FreeBSD™ or the like.

In some embodiments, there is also provided a non-transitory computer-readable storage medium including instructions, such as the memory 432 including instructions, which may be executed by the processing component 422 of the device 400 to implement the forgoing methods. For example, the non-transitory computer readable storage medium may be ROM, RAM, CD-ROM, magnetic tape, floppy disk, optical data storage device, and the like.

It may be further understood that "plurality of/multiple" in this disclosure refers to two or more, and other quantifiers are similar thereto. The term "and/or" describes the association relationship of associated objects, indicating that there may be three types of relationships. For example, A and/or B may indicate: A exists alone, both A and B exist, and B exists alone. The character "/" generally indicates that the contextual objects are in an "or" relationship. The singular forms "a", "said" and "the" are also intended to include the plural unless the context clearly indicates otherwise.

It may be further understood that the terms "first", "second", and the like are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of this disclosure, first information may also be called second information, and similarly, second information may also be called first information.

It may be further understood that although operations are described in a specific order in the drawings in the embodiments of this disclosure, it should not be understood as requiring that these operations be performed in the specific order shown or in a serial order, or that all operations shown be performed to obtain the desired result. In certain circumstances, multitasking and parallel processing may be advantageous.

Other embodiments of this disclosure will be readily apparent to those skilled in the art from consideration of the specification and practice of the invention disclosed herein. This application is intended to cover any modification, use or adaptation of this disclosure, and these modifications, uses or adaptations follow the general principles of this disclosure and include common knowledge or conventional technical means in the art, which are not disclosed in this disclosure. The specification and examples are to be considered exemplary only, with a true scope and spirit of the disclosure being indicated by the following claims.

It should be understood that this disclosure is not limited to the precise constructions which have been described above and shown in the drawings, and various modifications and changes may be made without departing from the scope thereof. The scope of this disclosure is limited only by the scope of the appended claims.

What is claimed is:

1. A method for sending sounding reference signal (SRS) used for antenna switching configuration, being performed by a terminal and comprising:

determining an SRS type configured by the terminal for antenna switching configuration, wherein the SRS type comprises at least two different SRS types;

determining that an antenna switching configuration corresponding to an SRS resource of a first SRS type is changed to a target antenna switching configuration, and synchronously updating an antenna switching configuration corresponding to an SRS resource of a second SRS type as the target antenna switching configuration, wherein the second SRS type comprises all of the at least two different SRS types other than the first SRS type;

selecting an SRS resource corresponding to the target antenna switching configuration as a target SRS resource; and sending the SRS resource of the first SRS type and the SRS resource of the second SRS type based on an antenna or an antenna port corresponding to the target SRS resource.

2. The method according to claim 1, further comprising:

receiving first indication information, wherein the first indication information indicates permission of synchronously updating antenna switching configurations corresponding to the at least two different SRS types as the target antenna switching configuration.

3. The method according to claim 2, wherein sending the SRS resource of the first SRS type and the SRS resource of the second SRS type comprises:

determining a change time when the antenna switching configuration is changed; and sending a to-be-sent SRS resource based on the change time and an SRS type of the to-be-sent SRS resource, wherein the to-be-sent SRS resource comprises the SRS resource of the first SRS type and the SRS resource of the second SRS type.

4. The method according to claim 3, wherein sending the to-be-sent SRS resource based on the change time and the SRS type of the to-be-sent SRS resource comprises:

in response to determining that the SRS type of the to-be-sent SRS resource is a periodic SRS resource or an aperiodic SRS resource, sending the to-be-sent SRS resource at the change time.

5. The method according to claim 3, wherein sending the to-be-sent SRS resource based on the change time and the SRS type of the to-be-sent SRS resource comprises:

in response to determining that the SRS type of the to-be-sent SRS resource is a semi-persistent SRS resource, sending the to-be-sent SRS resource in at least one of following manners:

starting sending of the to-be-sent SRS resource at the change time;

in response to that the change time is in a sounding sending cycle in which SRS has already started, sending, after a complete sounding is completed based on an SRS resource set corresponding to the sounding sending cycle, the to-be-sent SRS resource at a start time of a next sounding sending cycle; or sending the to-be-sent SRS resource in a next scheduling cycle after an SRS resource set scheduling cycle corresponding to the change time.

6. The method according to claim 1, further comprising:

determining that a pre-agreed condition is met, wherein the pre-agreed condition is a condition for synchronously updating antenna switching configurations corresponding to the at least two different SRS types as the target antenna switching configuration; and reporting second indication information, wherein the second indication information indicates that the antenna switching configuration is changed.

7. The method according to claim 6, wherein sending the SRS resource of the first SRS type and the SRS resource of the second SRS type comprises:

determining a reporting time for reporting the second indication information; and sending a to-be-sent SRS resource based on the reporting time and an SRS type of the to-be-sent SRS resource, wherein the to-be-sent SRS resource comprises the SRS resource of the first SRS type and the SRS resource of the second SRS type.

8. The method according to claim 7, wherein sending the to-be-sent SRS resource based on the reporting time and an SRS type of the to-be-sent SRS resource comprises:

in response to determining that the SRS type of the to-be-sent SRS resource is a periodic SRS resource or an aperiodic SRS resource, sending the to-be-sent SRS resource at the reporting time.

9. The method according to claim 7, wherein sending the to-be-sent SRS resource based on the reporting time and an SRS type of the to-be-sent SRS resource comprises:

in response to determining that the SRS type of the to-be-sent SRS resource is a semi-persistent SRS resource, sending the to-be-sent SRS resource in at least one of the following manners:

sending the to-be-sent SRS resource at the reporting time;

sending the to-be-sent SRS resource at a start time of a next sounding cycle after sounding is completed based on an SRS resource set corresponding to the reporting time; or sending the to-be-sent SRS resource in a next scheduling cycle after an SRS resource set scheduling cycle corresponding to the reporting time.

10. A terminal, comprising:

a processor; and a memory configured to store an instruction executable by the processor;

wherein the processor is configured to perform the method according to claim 1.

11. A method for receiving sounding reference signal (SRS) used for antenna switching configuration, being performed by a network device and comprising:

receiving an SRS resource of a first SRS type and an SRS resource of a second SRS type at an antenna or an antenna port corresponding to a target SRS resource, wherein receiving the SRS resource of the first SRS type and the SRS resource of the second SRS type comprises: receiving a to-be-received SRS resource based on a change time when the antenna switching configuration is changed and an SRS type of the to-be-received SRS resource, wherein the to-be-received SRS resource comprises the SRS resource of the first SRS type and the SRS resource of the second SRS type;

wherein an antenna switching configuration corresponding to the SRS resource of the second SRS type is a target antenna switching configuration changed from an antenna switching configuration corresponding to the SRS resource of the first SRS type, the second SRS type comprises all of at least two different SRS types other than the first SRS type, and the target SRS resource conforms to SRS resources corresponding to the target antenna switching configuration; and sending first indication information, wherein the first indication information indicates permission of synchronously updating antenna switching configurations corresponding to the at least two different SRS types as the target antenna switching configuration.

12. The method according to claim 11, wherein receiving the to-be-received SRS resource based on the change time when the antenna switching configuration is changed and the SRS type of the to-be-received SRS resource comprises:

in response to determining that the SRS type of the to-be-received SRS resource is a periodic SRS resource or an aperiodic SRS resource, receiving the to-be-received SRS resource at the change time.

13. The method according to claim 11, wherein receiving the to-be-received SRS resource based on the change time when the antenna switching configuration is changed and the SRS type of the to-be-received SRS resource comprises:

in response to determining that the SRS type of the to-be-received SRS resource is a semi-persistent SRS resource, receiving the to-be-received SRS resource in at least one of following manners:

starting receiving of the to-be-received SRS resource at the change time;

in response to that the change time is in a sounding sending cycle in which SRS has already started, receiving, after a complete sounding is completed based on an SRS resource set corresponding to the sounding sending cycle, the to-be-received SRS resource at a start time of a next sounding sending cycle; or receiving the to-be-sent SRS resource in a next scheduling cycle after an SRS resource set scheduling cycle corresponding to the change time.

14. The method according to claim 11, further comprising:

determining that a pre-agreed condition is met, wherein the pre-agreed condition is a condition for synchronously updating antenna switching configurations corresponding to the at least two different SRS types as the target antenna switching configuration; and receiving second indication information, wherein the second indication information indicates that the antenna switching configuration is changed.

15. The method according to claim 14, wherein receiving the SRS resource of the first SRS type and the SRS resource of the second SRS type comprises:

determining a reporting time for receiving the second indication information; and receiving the to-be-received SRS resource based on the reporting time and the SRS type of the to-be-received SRS resource, wherein the to-be-received SRS resource comprises the SRS resource of the first SRS type and the SRS resource of the second SRS type.

16. The method according to claim 15, wherein receiving the to-be-received SRS resource based on the reporting time and the SRS type of the to-be-received SRS resource comprises:

in response to determining that the SRS type of the to-be-received SRS resource is a periodic SRS resource or an aperiodic SRS resource, receiving the to-be-received SRS resource at the reporting time.

17. The method according to claim 15, wherein receiving the to-be-received SRS resource based on the reporting time and the SRS type of the to-be-received SRS resource comprises:

in response to determining that the SRS type of the to-be-received SRS resource is a semi-persistent SRS resource, receiving the to-be-received SRS resource in at least one of following manners:

receiving the to-be-received SRS resource at the reporting time;

receiving the to-be-received SRS resource at a start time of a next sounding cycle after sounding is completed based on an SRS resource set corresponding to the reporting time; or receiving the to-be-received SRS resource in a next scheduling cycle after an SRS resource set scheduling cycle corresponding to the reporting time.

18. A network device, comprising:

a processor; and a memory configured to store an instruction executable by the processor;

wherein the processor is configured to perform the method according to claim 11.

\*　\*　\*　\*　\*